United States Patent
Hubler et al.

(10) Patent No.: US 8,699,206 B1
(45) Date of Patent: Apr. 15, 2014

(54) NANO VACUUM TUBE ARRAYS FOR ENERGY STORAGE

(75) Inventors: Alfred W. Hubler, Urbana, IL (US); Onyeama Osuagwu, East Savoy, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 614 days.

(21) Appl. No.: 12/908,107

(22) Filed: Oct. 20, 2010

Related U.S. Application Data

(60) Provisional application No. 61/253,605, filed on Oct. 21, 2009.

(51) Int. Cl.
*H01G 4/02* (2006.01)
*H01G 4/38* (2006.01)

(52) U.S. Cl.
USPC ........... 361/326; 361/328; 977/762; 977/720; 977/723

(58) Field of Classification Search
None
See application file for complete search history.

(56) References Cited

U.S. PATENT DOCUMENTS

| | | | |
|---|---|---|---|
| 5,612,588 A * | 3/1997 | Wakalopulos | 313/420 |
| 7,667,996 B2 | 2/2010 | Shepard | 365/118 |
| 2007/0247890 A1* | 10/2007 | Shepard | 365/105 |

OTHER PUBLICATIONS

Eden et al., "Microplasma devices fabricated in silicon, ceramic, and metal/polymer structures: arrays, emitters and photodetectors," *J Phys. D. Appl. Phys.*, vol. 36, No. 23, pp. 2869-2877 (Dec. 2003).
Ekanayake et al., "Design of deep-nanometer-scale capacitors and associated materials challenges," *Curr. Appl. Phys.*, vol. 4, 4 pages (2004).
Hubler, "Digital Batteries," *Complexity*, vol. 14, No. 3, pp. 7-8 (Dec. 2008).
Hwang et al., "Fabrication of vacuum tube arrays with a sub-micron dimension using anodic aluminum oxide nano-templates," *Microelectron. Eng.*, vol. 77, No. 1, pp. 2-7 (Jan. 2005).
Kolodzey et al., "Electrical Conduction and Dielectric Breakdown in Aluminum Oxide Insulators on Silicon," *IEEE T. Electron Dev.*, vol. 47, No. 1, pp. 121-128 (Jan. 2000).

* cited by examiner

*Primary Examiner* — Jayprakash N Gandhi
*Assistant Examiner* — Dion Ferguson
(74) *Attorney, Agent, or Firm* — Sunstein Kann Murphy & Timbers LLP

(57) ABSTRACT

Methods and apparatus for storing information or energy. An array of nano vacuum tubes is evacuated to a pressure below $10^{-6}$ Torr, where each nano vacuum tube has an anodic electrode, a cathodic electrode spaced apart from the anodic electrode, and an intervening evacuated region. An excess of electrons is stored on the cathodic electrode.

12 Claims, 4 Drawing Sheets

NANO VACUUM TUBE ARRAYS FOR ENERGY STORAGE

The present Application claims priority from U.S. Provisional Patent Application Ser. No. 61/253,605, filed Oct. 21, 2009, and incorporated herein by reference.

This invention was made with government support under Grant DMS 03-25939 ITR, awarded by the National Science Foundation. The Government has certain rights in the invention.

TECHNICAL FIELD

The present invention relates to devices and methods for high-density storage of energy in materials configured as nano vacuum tubes subject to specified material and geometrical properties.

BACKGROUND ART

The position of an electrical charge within an electric field represents a potential energy that may be converted to work through displacement of the charge. Stable separation of electrical charge gives rise to storage of energy as potential energy, and is typically accomplished chemically, in batteries, or electrostatically, in capacitors. Electrostatic storage in capacitors is limited by dielectric breakdown, while chemical batteries suffer from the drawback of limited charge/discharge rates. Reverse-biased diodes used for energy storage are limited by field emission, avalanche breakdown, and Zener breakdown. Limitations of existing technologies are also discussed in the following pages.

Electrical energy from a DC power source can be stored in conventional capacitors, electrochemical capacitors, chemical batteries, and diodes. Conventional parallel plate capacitors can be charged and discharged quickly and they have a virtually unlimited life time, but their energy density is small, because of dielectric breakdown. For instance, when the electric field E exceeds about 0.118 V/nm in a 25-μm thick Teflon sheet coated with w=100 nm thin-film electrodes, a spark discharges the capacitor and the energy is lost as heat. This limits the energy density in aluminum-Teflon-aluminum capacitors to about $$u = \frac{\epsilon_0 \epsilon_r E^2}{2} = 265 \text{ kJ/m}^3 (125 \text{ J/kg}),$$

where $\epsilon_0 = 8.85 \times 10^{-12}$ F/m is the vacuum permittivity and $\epsilon_r = 2.15$ is the relative permittivity of Teflon. Commercial capacitors have energy densities up to 300 J/kg. The inductance of the capacitor circuit limits the rate at which the capacitor can be charged and discharged to about $10^7$ W/kg.

Solid state diodes, such as varactor diodes, can be used for energy storage as well. Semiconductor diodes with reverse bias store energy in the depletion layer. However, field emission, avalanche breakdown and Zener breakdown limit the electric field to about E=0.02 V/mm (in silicon with donor concentration $N=10^{14}$ cm$^{-3}$), and the energy density is less than in conventional capacitors. Field emission, i.e. quantum mechanical tunneling of carriers through the band gap, is the dominant breakdown mechanism for highly doped p-n junctions. Zener breakdown occurs when the electric field becomes large enough to excite valence electrons in the depletion zone directly into the conduction band. Avalanche breakdown occurs when the minority carriers are accelerated in the electric field in the depletion region to sufficient energies that they can excite valence electrons through collisions. Energy storage in semiconductor junctions is further limited by the fact that the depletion zone is not a perfect insulator and reverse saturation currents discharge the diode. The charge-discharge rate of diodes, limited by the mobility of the carriers, is much higher than in batteries. Tunnel junction have the highest switching speeds (up to 5 GHz), but their reverse-biased breakdown voltage is small.

SUMMARY OF EMBODIMENTS OF THE INVENTION

As used herein and in any appended claims, the term "nano vacuum tube" will refer to a vacuum tube characterized by sub-micrometer lengths in at least two dimensions.

Similarly, the term "nano-tip" refers to a conducting structure characterized by sub-micrometer lengths in at least two dimensions. A nano-tip may be pointed, curved, or flat.

In accordance with embodiments of the present invention, a method is provided for storing energy. The method has steps of:

a. providing an array of vacuum tubes having walls, each vacuum tube including
 (1) an anodic electrode; and
 (2) a cathodic electrode spaced apart from the anodic electrode; and
 (3) a region intervening between the anodic electrode and the cathodic electrode of each vacuum tube evacuated to a pressure below $10^{-6}$ Torr; and b. storing an excess of electrons on the cathodic electrode.

In accordance with alternate embodiments of the invention, the array of vacuum tubes may be characterized by a cross-sectional density of at least 100 vacuum tubes per square centimeter. Each vacuum tube may be a nano vacuum tube. The anodic electrode may be pointed, curved, or flat, and may be a nano-tip electrode. More particularly, the nano-tip electrode may be a Spindt tip. The nano-tip may be characterized by an apex radius comparable in size to a single atom, and may be a Mueller emitter or a free-standing nano wire. The cathodic electrode may be reverse biased respect to the nano-tip electrode.

In accordance with other embodiments of the invention, the walls of the vacuum tubes may be silica.

In a further aspect of the present invention, a method is provided for configuring a device to deliver powers in excess of $10^{10}$ W/kg. The method has steps of:

a. providing the device, comprising an array of nano vacuum tubes having walls, each nano vacuum tube including
 (1) a nano tip anodic electrode; and
 (2) a flat electrode spaced apart from the nano-tip anodic electrode; and
 (3) a region intervening between the nano-tip anodic electrode and the flat electrode of each vacuum tube evacuated to a pressure below $10^{-6}$ Torr;

b. storing an excess of electrons on the cathodic electrode; and c. coupling the nano-tip electrodes and the flat electrodes to an external current path.

BRIEF DESCRIPTION OF THE DRAWINGS

Advantages of the present invention and its several improvements will be seen when the following detailed description is read in conjunction with the accompanying drawings, in which.

DETAILED DESCRIPTION OF EMBODIMENTS OF THE INVENTION

Advantages of the present invention and its several improvements will be seen when the following detailed description is read in conjunction with the embedded drawings.

Publications cited on the following pages are incorporated herein by reference.

Techniques for fabricating dense arrays of diodic structures are described, for example, by Eden et al., *Microplasma Devices Fabricated in Silicon, Ceramic, and Metal/Polymer Structures: Arrays, Emitters and Photodetectors*, J. Phys. D, vo. 36, pp. 2869-77 (2003), which is incorporated herein by reference.

Spindt tips are described in Spindt et al., *Physical properties of thin-film field emission cathodes with molybdenum cones*, J. Appl. Phys., vol. 47, pp. 5248-63 (1976).

Single-atom apex Mueller emitters are described in Ward et al., *Helium ion microscope: A new tool for nanoscale microscopy and metrology*, J. Vac. Sc. Technol. B, v. 24, pp. 2871-74, (2006). Both of the foregoing papers are incorporated herein by reference.

The following documents are incorporated herein by reference:

Hübler, *Digital Batteries, Complexity*, vol. 14(3), pp. 7-9 (Dec. 15, 2008); and Hübler & Osuagwu, *Digital quantum batteries: energy and information storage in nano vacuum tube arrays*, Sep. 22, 2009;

Hübler & Osuagwu, *Digital quantum batteries: Energy and information storage in nano vacuum tube arrays, Complexity*, vol. 15(5), pp. 48-55), (2010).

Hübler & Lyon, *Energy Storage in Cylindrical Vacuum Carbon Nanotube Capacitor Arrays*, Apr. 2, 2010;

Belkin, Lyon, Bezryadin & Hübler, *Nanotube Vacuum Capacitors: A Verification of Field Enhancement Scaling*, Jul. 15, 2010; and Lyon, Soni, Koepke, Lyding and Hübler, *Scaling of the Fowler-Nordheim Field Enhancement Factor*, Sep. 15, 2010.

Figure 1A:
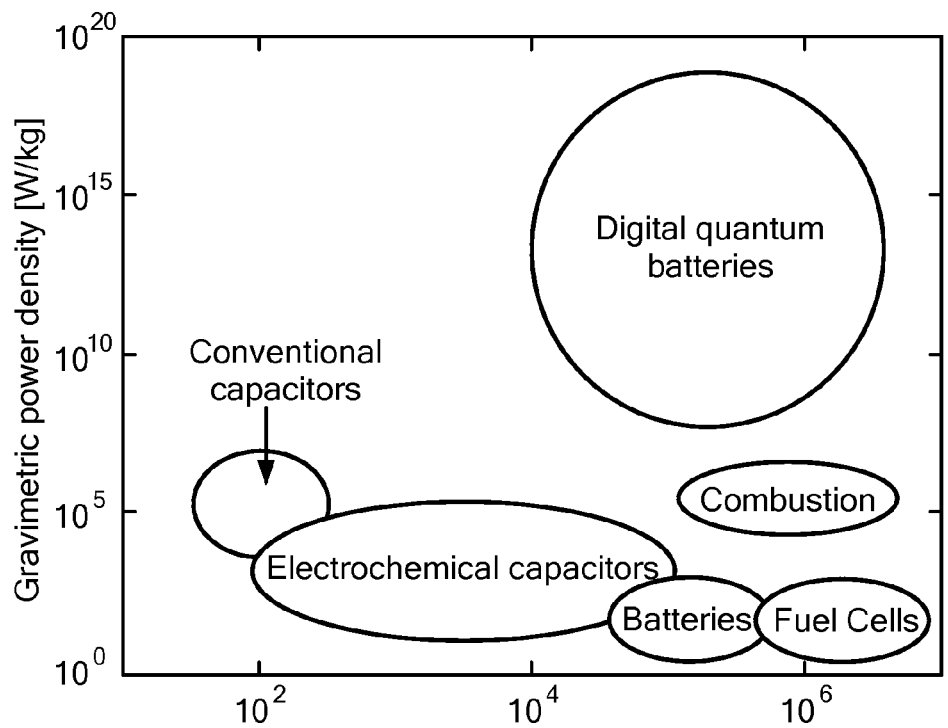
FIGS. 1A and 1B depict power and energy density regimes of various energy storage modalities.
Figure 1B:
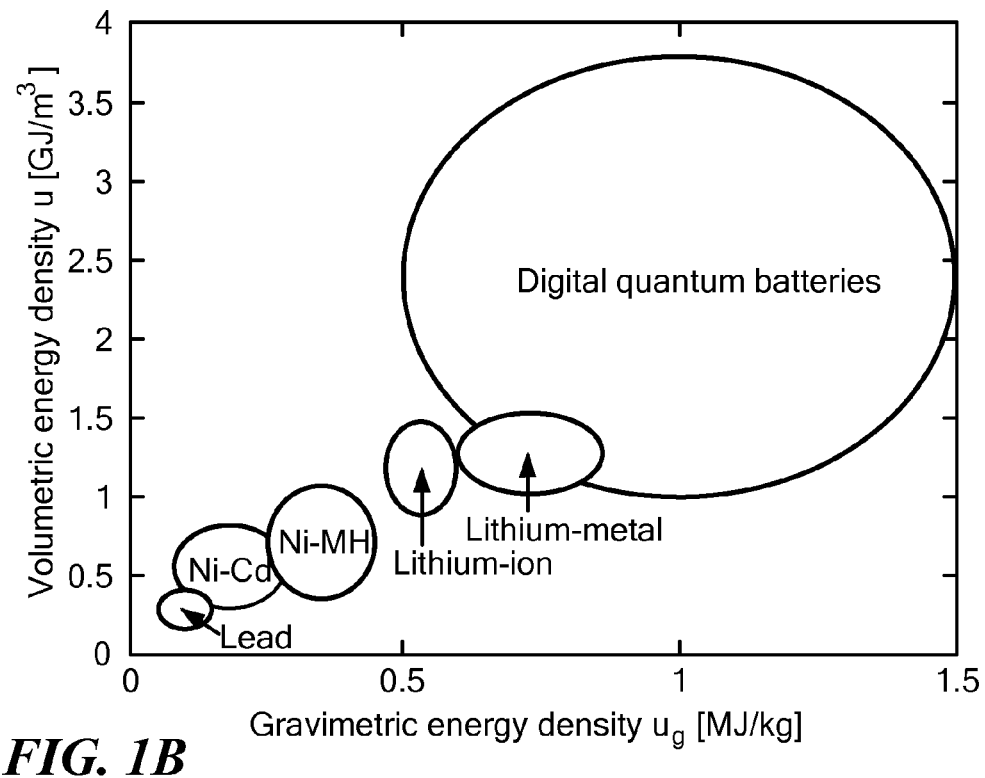

In molecules and atoms, such as the hydrogen atom, and in solids, such as metallic Li, electric fields can be much larger than typically limited by dielectric breakdown because quantization phenomena suppress charge recombination. Consequently, the electrostatic energy density can be much higher than in conventional capacitors. For example, the electric field at the surface of a hydrogen nucleus is about $10^{11}$ V/nm, and when a hydrogen molecule is dissociated and ionized in water, two hydrated hydronium ions are created and the local increase in energy density is $(2 \times 13.6 \text{ eV} + 4.52 \text{ eV})/4 \times 10^{-28}$ $m^3 = 29$ GJ/$m^3$ (29 MJ/kg). Therefore, devices which use electrochemical reactions and other faradic processes can store more energy than conventional capacitors. Commercial electrochemical capacitors can reach an energy density of up to 18 kJ/kg, pseudo capacitors reach up to 108 kJ/kg and, in chemical batteries, the energy density can be as large as 540 kJ/kg. FIGS. 1A and 1B depict energy and power density regimes of various energy storage modalities. However, faradic processes have small charge-discharge rates because they depend on the diffusion of ions in the electrolyte ($<10^5$ W/kg for electrochemical capacitors, $<10^3$ W/kg for batteries) and on chemical reaction rates (See FIGS. 1A and 1B). Furthermore, the number of charge/discharge cycles of electrochemical capacitors and batteries is small. Instabilities in the electro-crystallization lead to metal dendrites, that can cause short circuits, and irreversible chemical reactions can create films of solid material on the electrodes.

Nano vacuum tube arrays with nano-tip electrodes and flat electrodes conduct current only if the tip is charged negatively (forward direction) and if the electric field at the tip exceeds a threshold. If the electric field is reversed there is no current. Only at a much higher electric field, current will start to flow in reverse direction. Therefore nano vacuum tubes can be used as diodes and triodes and, in a reverse direction, they can be used for energy storage like a varactor diode or a capacitor. Nano plasma tubes are generally forward-biased and if the residual gas emits visible light, they can be used for flat-panel plasma lamps and flat panel monitors. Their switching speed in the THz range, which is a factor of 1000 larger than the fastest semiconductor junctions. One of the original two device types, the "Spindt array," used silicon integrated-circuit fabrication techniques to make regular arrays in which molybdenum cones were deposited in small cylindrical voids in an oxide film, with the void covered by a counter electrode with a central circular aperture. The energy density in reverse-biased nano plasma tubes is small, because gas becomes a partially ionized, conducting plasma at comparatively small electric fields.

Energy storage is now described as embodied in arrays of reverse-biased nano vacuum tubes, which are similar in design to nano plasma tubes, but which contain little or no gas. The key design parameter is the gap size, the distance between the electrodes. Electrical breakdown in vacuum gaps has been studied for more than 80 years for gap sizes above 200 nm. However, little is known about vacuum gaps in the nanometer range. It is shows herein that in reverse bias the electric field near nano-tip anodes can be larger, by orders of magnitude, than breakdown field in conventional capacitors, varactor diodes, and nano plasma tubes.

Since there are only residual gases between the electrodes in vacuum junctions, there is no Zener breakdown, no avalanche breakdown, and no material that could be ionized. Electrical breakdown is triggered by quantum mechanical tunneling of electrode material: electron field emission on the cathode and ion field emission on the anode. Because the energy barrier for electron field emission is large and the barrier for ion field emission even larger, the average energy density in reversed-biased nano vacuum tubes can exceed the energy density in solid state tunnel junctions and electrolytic capacitors. Since the inductance of the tubes is very small, the charge-discharge rates exceed batteries and conventional capacitors by orders of magnitude. Charging and discharging involve no faradaic reactions so the lifetime of nano vacuum tubes is virtually unlimited. The volumetric energy density is independent of the materials used as long as they can sustain the mechanical load, the electrodes are good conductors, and the mechanical supports are good insulators. Therefore, nano vacuum tubes can be built from environmentally friendly, non-noxious materials. Materials with a low density are preferable, since the gravimetric density is the ratio between the volumetric energy density and the average density of the electrodes and supports. Leakage currents are small, since the residual gases contain very few charged particles. Nano vacuum tubes can be fabricated with standard photo lithographic techniques, as described, for example, by Hwang et al., *Fabrication of vacuum tube arrays with a sub-micron dimension using anodic aluminum oxide nano-templates, Microelectronic Engineering*, vol. 77, pp. 2-7 (2005), which is incorporated herein by reference, and could be easily integrated in integrated circuits as a rechargeable battery.

Nano vacuum tubes with planar cathodes are now described. The anodes may be sharply pointed tips, such as Spindt tips, first described by Spindt et al., *Physical properties of thin-film field emission cathodes with molybdenum cones, J. Appl. Phys.*, vol. 47, pp. 5248-63 (1976), which is incorporated herein by reference. Alternatively, the anodes may be the endings of cantilever nanotubes, as described by Ke et al., *Experiments and modeling of carbon nanotube-based NEMS devices, J. Mechanics and Physics of Solids*, vol. 53, pp. 1314-33 (2005), incorporated herein by reference.

Figure 2:
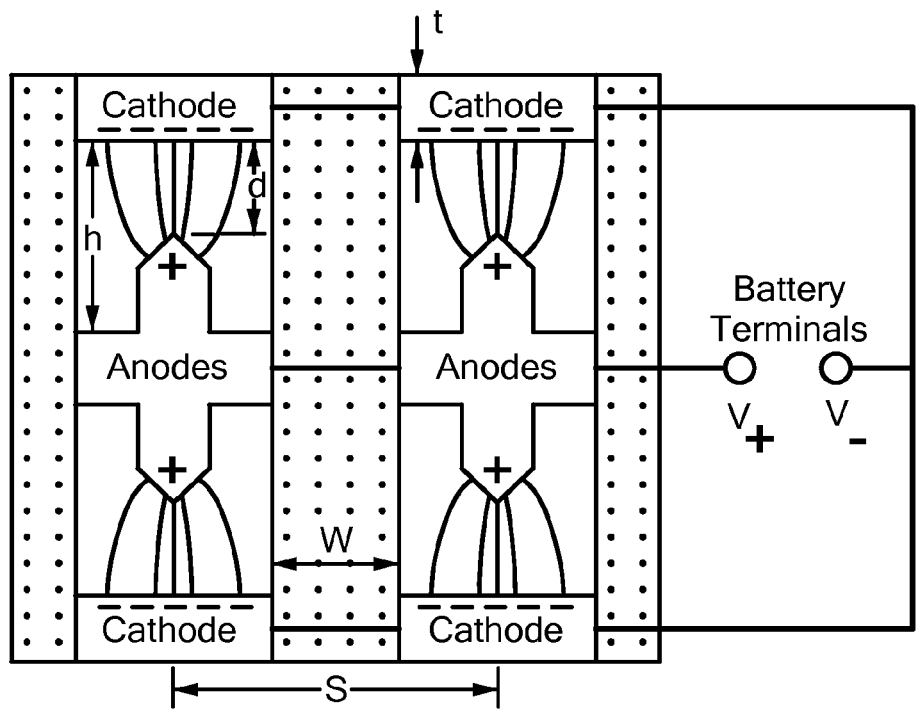
FIG. 2 shows an array of four nano vacuum tubes for energy storage in accordance with an embodiment of the present invention.

FIG. 2 depicts four nano vacuum tubes. Cathodes are designated by a '−' symbol, while the anodes, nano tips on a flat electrode, are designated by a '+' symbol. The tips are arranged in a square grid at distance s. The gap size d is the shortest distance between the surface of the tip and the surface of the cathode. The height of the tube h is roughly equal to the apex radius of the tip r plus the gap size d, i.e., h≈r+d, and the distance between the tips is equal to the gap size plus the width of the insulating mechanical supports w, i.e., s≈d+w. The thickness of the planar electrodes is t. The cathode is a conducting solid with high tensile strength, such as steel. The nano tip is a conducting solid with extremely high tensile strength, such as a carbon nanotube clamped to the steel electrode, or a tungsten Spindt tip. The insulating walls, designated in FIG. 2 by dots, are solids with high compressive strength, such as silicon oxides. Thin curved lines in FIG. 2 indicate electric field lines. The electrodes and the walls create a vacuum tube. The smallest tips are single-atom-apex Mueller emitters with apex radius r≈0.1 nm, about twice the crystallographic size of a single atom. Techniques for preparing Mueller emitters have been under investigation for many years. Recently an automatic technique has been developed for restoring a single-atom apex to its original state, if the top atom moves away from this position, as is described by Ward et al., *Helium ion microscope: A new tool for nanoscale microscopy and metrology, J. Vac. Sci. Technol.*, vol. 24, pp. 2871-74 (2006), which is incorporated herein by reference.

Another type of tip-anode is represented by free-standing nano-wires, with an apex radius of r≈5 nm, clamped in normal direction to a planar metal anode. Pre-breakdown heating of the anode and the anode current will generally be small because the electrons penetrate several layers of the anode material and spread the heat over a large volume.

The energy density of nano vacuum tubes is limited by vacuum breakdown. At gas pressures of less than $10^{-6}$ Torr, the breakdown field does not depend on the residual gas, but on the properties of the electrode surfaces.

Figure 3:
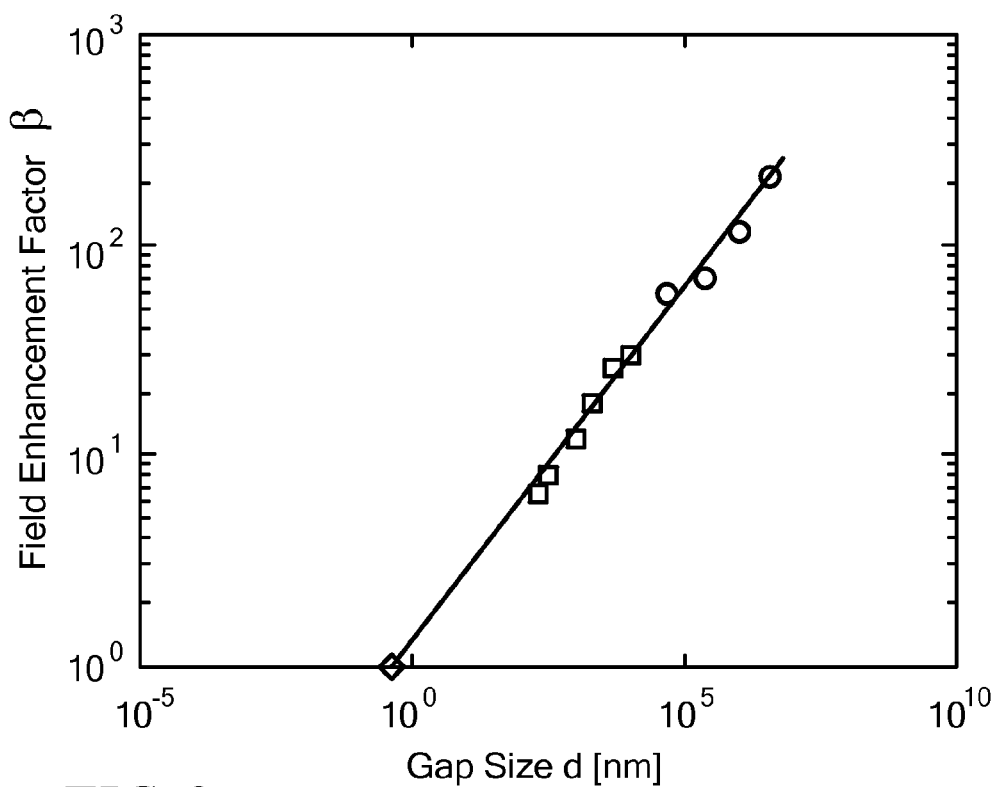
FIG. 3 shows a plot of field enhancement factor versus gap size.

The local cathode fields, enhanced by a factor β by micro-protrusions and other surface defects, determines the breakdown field $E_b = \beta E_s$, where $E_s$ is the macroscopic field on the cathode surface when an arc develops. FIG. 3 shows the relation between the field enhancement factor β and the gap size d. The function $$\beta = \left(\frac{d}{0.4 \text{ nm}}\right)^{1/3}$$

approximates the relation between β and the gap size d for tungsten electrodes for d>1 nm. The field enhancement factor of copper electrodes, niobium electrodes, or niobium electrodes with a layer of gold has a similar dependence on the gap size. However β is larger for thinner and taller cathodes, and β tends to get smaller if the electrodes are thermally treated or allowed to break down many times. Only tubes with wide and short cathodes are considered in the analysis described herein. The limiting value for beta is equal to one for gap sizes of the size of one atom, as depicted in FIG. 3, where the field enhancement factor is plotted versus gap size. In FIG. 3, circles and squares indicate experimental values.

The largest component of cathode current is Fowler-Nordheim field emission, a quantum mechanical phenomenon describing the tunneling of electrons through the energy barrier at a charged metal-vacuum interface. The current density J depends on the electric field E at the surface, $$J = J_0 \left(\frac{E^2}{E_0^2}\right) e^{E_0/E},$$

where $E_0 = f \Phi^{3/2}$ and Φ is the work function of the metal. $J_o$ and f are material constants.

For niobium, the work function is 4 eV, and $J_0 = 1.15 \times 10^{15}$ A/m² = 1.15 kA/μm² and $E_0 = 54.6$ V/nm. Breakdown occurs roughly at about twice the onset of field emission, i.e. $E_0 \approx E_b$. The breakdown field has a very small temperature dependence, i.e., the breakdown field is almost same at room temperature as at 100° C. Clean cathodes of tungsten, copper, niobium, or niobium with a layer of gold have a breakdown field of about $E_b = 60$ V/nm. The maximum energy density near the cathode, $u_c = \epsilon_0 / 2 E_s^2$ depends on the gap size d as:

$$u_c = \frac{\varepsilon_0}{2} \frac{E_s^2}{\beta^2} = \varepsilon_0 E_b^2 \left(\frac{0.4 \text{ nm}}{d}\right)^{2/3},$$

where $\epsilon_0 = 8.85 \times 10^{-12}$ is the vacuum permittivity.

Figure 4A:
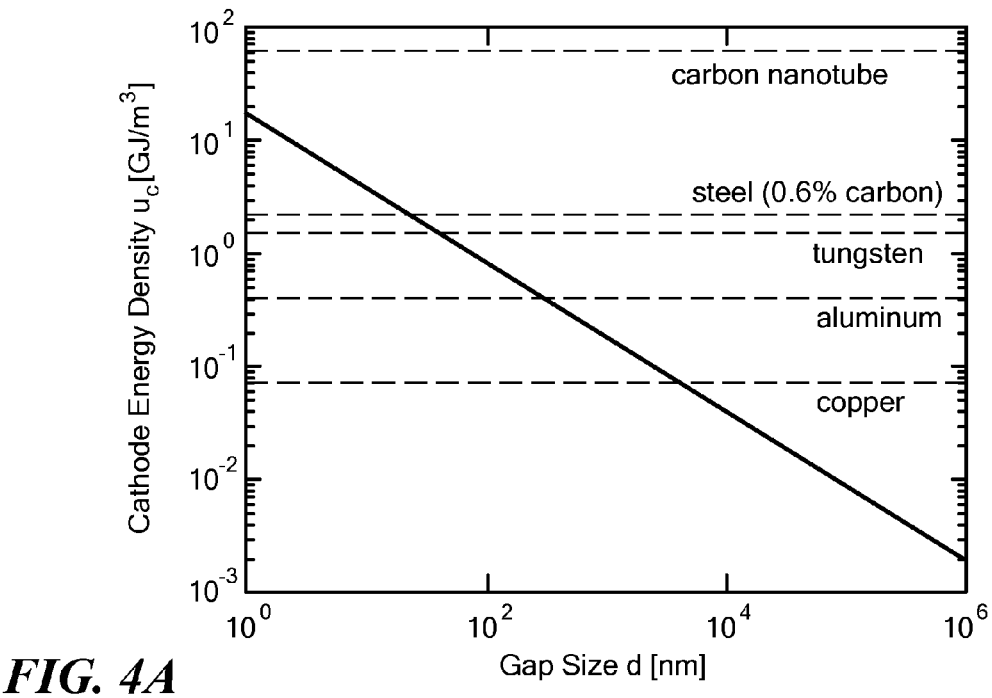
FIGS. 4A and 4B show regimes of operation, in accordance with embodiments of the present invention, in the plane of gap size vs. cathode energy density.
Figure 4B:
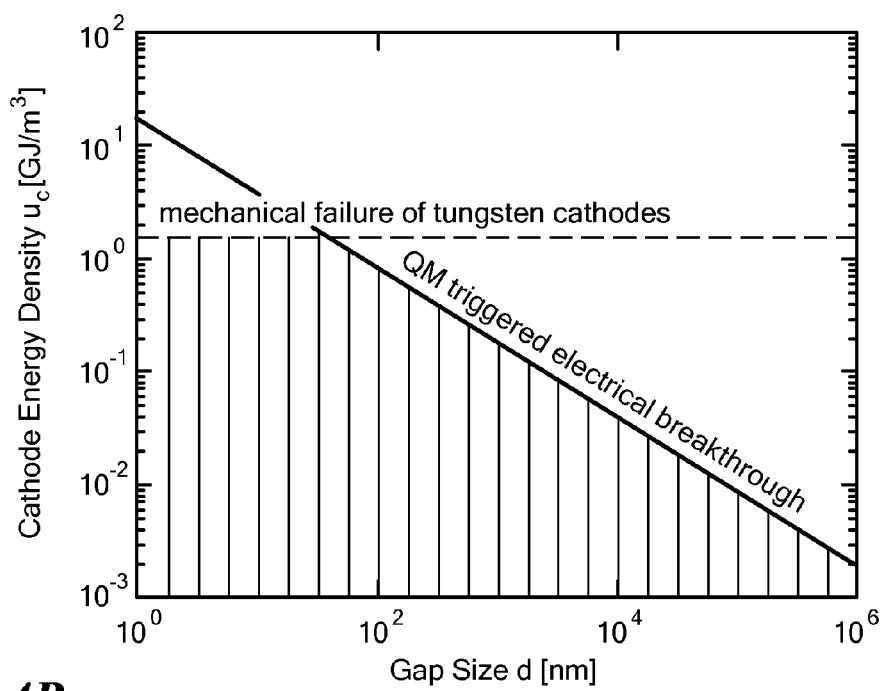

FIGS. 4A and 4B show the maximum energy density near the cathode as a function of gap size. The continuous line illustrates the energy density at the cathode at breakdown vs. the gap size. As apparent from the diagonal line plotted in FIGS. 4A and 4B, the maximum energy density is larger for smaller gap sizes. For example, in a tube with gap size d=25 nm the maximum energy density at the cathode is a factor of 100 larger than in a tube with gap size d=25 μm. The electric field creates a force on the surface of the cathode. The pressure $p_c$ on the cathode surface due to electric fields equals the energy density at the surface, i.e. $p_c = u_c$. The cathode disintegrates if $u_c$ exceeds the tensile strength $P_t$ of the cathode material. Therefore, the tensile strength of the cathode material limits the energy density near the cathode $u_c$ too. The dashed lines in FIG. 4A indicate the tensile strengths of various cathode materials. The shaded area in FIG. 4B indicates where the energy storage is stable in a tube with a tungsten cathode. If the voltage on a tube with gap size d=10 nm is increased, the energy density at the cathode increases, until it reaches $u_c = 1.51$ GJ/m³. The pressure on the electrode then exceeds the tensile strength of tungsten and the electrode disintegrates. However, if a vacuum junction with gap size d=10 μm is charged, field emission will trigger electrical breakdown at an energy density which is much below the tensile strength of tungsten, as shown in FIG. 4B.

The mechanical supports and the electrodes form vacuum micro-tubes. Hwang et al. have shown that is possible to fabricate nano vacuum tubes which are stable under atmospheric pressure. In the following, it is assumed that the micro-tubes are roughly cubical, and that the tips are far enough from the planar anode that the electric field E in the tube can be approximated by a point charge with its image charge at the cathode. Furthermore, any interaction between tubes is neglected. A coordinate system is introduced in which the apex centers of the tips are in the x-y plane and the origin is at the apex center of one of the tips. The electric field at a position x in the tube between the electrodes is complicated but can be roughly approximated by a point charge in front of a conducting plane, namely:

$$E(x) = E_a r^2 \left( \frac{x}{|x|^3} + \frac{x_i - x}{|x_i - x|^3} \right), \quad (3)$$

where $E_a$ is the magnitude of the electric field at the surface of the anode, and $x_i=(0, 2d+2r, 0)$ is the location of the image charge.

Assuming that the largest electric field at the cathode is equal to the breakdown field, i.e., $|E(0, d+r, 0)|=E_s$, Eqs. 1 and 3 yield a relation between the electric field at the anode and the electric field at the cathode:

$$E_s = \frac{E_b}{\beta} = 2E_a \frac{r^2}{(d+r)^2}. \quad (4)$$

Therefore, the maximum energy density $u_a$ at the anode depends on the maximum energy density $u_c$ at the cathode and the sharpness of the tip, $$u_a = \frac{\varepsilon_0}{2} E_a^2 = u_a \frac{(1+S)^4}{4} = \varepsilon_0 E_b^2 \left( \frac{0.4 \text{ nm}}{d} \right)^{2/3} \frac{(1+S)^4}{4},$$

where the ratio $$S = \frac{d}{r}$$

is a measure of the sharpness of the tip. If the energy density at the anode is larger than this value, then field emission at the cathode triggers an electrical breakdown. A sharply tipped anode can have a very high energy density without exceeding the limiting energy density at the cathode.

Figure 5A:
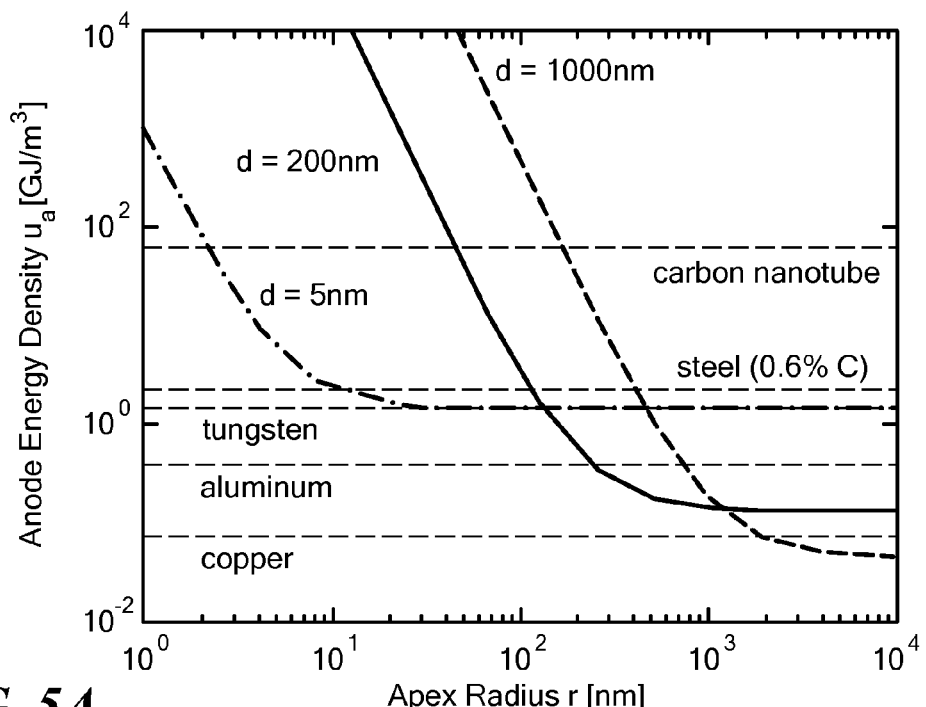
FIGS. 5A and 5B show regimes of operation, in accordance with embodiments of the present invention, in the plane of anode apex radius vs. anode energy radius.
Figure 5B:
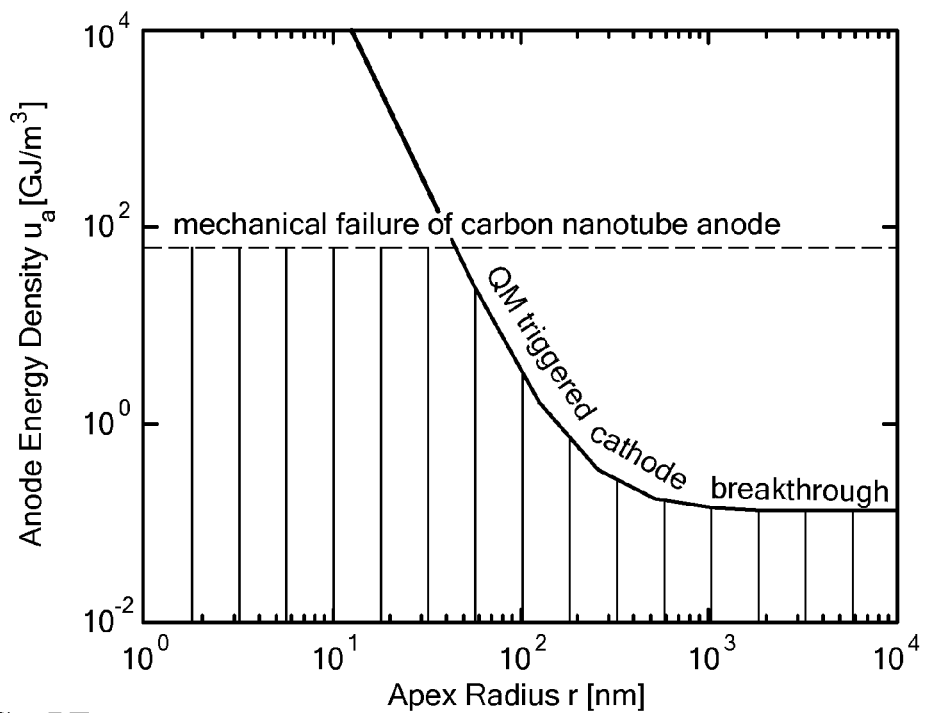

FIGS. 5A and 5B show the maximum energy density at the anode versus the sharpness of the tip for gap sizes d=5 nm, d=200 nm and d=1 μm and apex radius 1 nm<r<10 μm. FIG. 5A illustrates the tensile strength of typical anode materials. The shaded area in FIG. 5B indicates where the energy storage is stable in a tube with a carbon nanotube anode and a cathode that does not fail mechanically.

If the voltage If the voltage on the tube with apex radius r=10 nm is increased, the energy density at the anode increases, until it reaches $u_a$=62 GJ/m³. The pressure on the electrode then exceeds the tensile strength of carbon nanotubes and the anode disintegrates. However, if a vacuum junction with apex r=10 μm is charged, field emission on the cathode will trigger electric break down even if energy density at the anode is much below the tensile strength of carbon nanotube anode, as evident in FIG. 4B. Eqs. 1-4 imply that the average electric field at the cathode $E_s$, is limited by (i) the field enhancement factor β, which is a function of the gap size d, (ii) the work function $E_b$ of the cathode material, (iii) the tensile strength of the cathode $P_c$ and the anode $P_a$ and (iv) the sharpness of the anode S, yielding:

$$E_s = E_a \frac{2r^2}{(d+r)^2} = \min \left\{ \frac{E_b}{\beta}, \sqrt{\frac{2P_c}{\varepsilon_0}}, \sqrt{\frac{2P_a}{\varepsilon_0(1+S)^4}} \right\}.$$

Within the vacuum tube, the electric field is largest near the y-axis within the $$\text{region } R = \left\{ (x, y, z) | x^2 < \frac{d^2}{4(d+r)^2} y^2 \text{ and } z^2 < \frac{d^2}{4(d+r)^2} y^2 \right\}.$$

Therefore, the average energy density u in the tube at breakdown may be estimated from the electric field near the y-axis as:

$$u_a = \frac{\varepsilon_0}{2} E_a^2 = u_c \frac{(1+S)^4}{4} = \varepsilon_0 E_b^2 \left( \frac{0.4 \text{ nm}}{d} \right)^{2/3} \frac{(1+S)^4}{4},$$

where $$S = \frac{d}{r}$$

is a measure of the sharpness of the tip.

Eq. 4 implies that field emission at the cathode triggers electric breakdown if the average energy density exceeds $$u \approx \frac{\varepsilon_0}{2} E_S^2 \begin{cases} 1 \text{ if } 0 \leq S \leq 2 \\ \frac{S+2}{4} \text{ if } S > 2. \end{cases}$$

Therefore, $$u = e_t \cdot \min \left\{ \frac{\varepsilon_0}{2} \frac{E_b^2}{\beta^2}, P_c, \frac{P_a}{(1+S)^4} \right\},$$

where $e_t$ is the tip enhancement factor, and $e_t$=1 for 0≤S≤2, $e_t$=(S+2)/4 for S≥2, and $e_t$=S/4 for S>>2. In small tubes, the average energy is often limited by the tensile strength of the electrodes ($P_c$ and $P_a$), and not by electric breakdown.

For instance, in a tube with a flat tungsten electrodes and gap size d=40 nm, the average energy density is limited by the tensile strength of the tungsten electrodes, as seen in FIG. 4B. The limiting value of the average energy density is $u=P_t$=1.51×109 J/m³, which is about a factor of $10^4$ larger than in conventional capacitors. Carbon nanotubes have a very high tensile strength of about 62 GPa (compared with a theoretical limit of about 300 GPa. Therefore, carbon nanotubes are preferred for the anode, and tungsten is preferred for the cathode. For a tube with a carbon nanotube anode (r=5 nm), a flat tungsten cathode and the same gap size (d=40 nm) the average energy density is u=2.5 $P_t$=3.78 GJ/m$^3$.

The wall material, such as SiO$_2$, needs to support this load. According to Pascal's law, the minimum cross sectional area of the wall material $A_w$ is:

$$A_w = A_c \frac{u}{e_t A P_w},$$

where $P_w$ is the compressive strength of the wall material and $A_c$ is the area of the cathode. The compressive strength of SiO$_2$ is about $P_w$=109 Pa. For a tube with flat electrodes (S=0) and gap size d=40 nm and u=1.51 GJ/m$^3$, the cross sectional area of the wall has to be at least 1.51 times the area of the cathode, i.e. $A_w/d^2$=1.5. In this case, the average density of the tube is not much less than the density of the wall material.

Assuming that the electrodes are very thin, i.e., t<<d, the average density of the tube is $$\rho = \frac{A_w \rho_w + A_c \rho_g}{A_w + A_c},$$

where $\rho_g$ is the density of the residual gas in the tube. Since the density of the residual gas is very small, $\rho_g << \rho_w$, the density can be approximated by $$\rho = \frac{A_w \rho_w}{A_w + A_c}.$$

Then, the gravimetric energy density $u_g$ at breakdown is:

$$u_g = \frac{u}{\rho} = \frac{u}{\rho_w} + u_{g,min}$$

where $u_{g,min}$ is the minimum gravimetric energy density. If the average energy density u is small, the walls can be very thin, and therefore the gravimetric energy density is at least $u_{g,min}$. Therefore, the gravimetric energy density is in the range:

$$e_t \frac{P_w}{\rho_w} \leq u_g \leq \frac{u}{\rho_w} + e_t \frac{P_w}{\rho_w},$$

where $e_t$>1 is the tip enhancement factor. If the energy density is less than the compressive strength of the wall material, then the insulating walls can be thin, and thus the compressive strength of the walls sets a lower limit for the gravimetric energy density. For SiO$_2$ walls, the ratio $P_w$=200 kJ/kg is only a factor of two less than the maximum gravimetric density of chemical batteries. For a tube with flat tungsten electrodes and gap distance d=40 nm, the gravimetric energy density is $u_g$=600 kJ/kg. For a tube with a carbon nanotube anode (r=5 nm), a flat tungsten cathode, SiO$_2$ walls, and the same gap size d=40 nm, the gravimetric energy density is $u_g$=1.51 MJ/kg. This value is a factor of three larger than the maximum gravimetric energy density of Li-metal batteries, as shown in FIG. 1.

The most significant drawback to nano vacuum tubes is the high voltage. The largest potential difference between the electrodes is $$\Delta V = \int_r^{r+d} E(0, y, 0) dy = E_a r^2 \frac{d}{r(d+r)}.$$

Applying Eq. 4 and Eq. 1 leads to:

$$\Delta V = E_s d \cdot e_v,$$

where $E_s$, is the electric field at the cathode, and $$e_v = \frac{(1+S)^2}{1+2S}$$

is the voltage enhancement factor. The voltage enhancement factor can be approximated by $e_v$=1 if 0≤S≤2, and otherwise $e_v$=S/2.

For a tube with flat electrodes (S=0) with gap size d=40 nm and $E_b$=60V/nm, the potential difference between the electrodes is ΔV=24V. For a tube with a carbon nanotube anode (r=5 nm), a flat tungsten cathode, SiO$_2$ walls, and gap size d=40 nm, the voltage is ΔV=114V.

The volumetric capacitance $$c = \frac{2u}{\Delta V^2}$$

of nano vacuum tubes is inversely proportional to the square of the gap size:

$$c = \frac{\epsilon_0}{d^2} \frac{e_t}{e_v}.$$

Therefore, tubes with a smaller gap size have a higher capacitance. If the anode is flat (S=0), then the capacitance is $$c = \frac{\epsilon_0}{d^2}$$

and for tubes with sharply pointed anodes (S≥2), the capacitance is approximately $$c \approx \frac{\epsilon_0}{d^2} \frac{2}{S}.$$

This means that tubes with sharply pointed anodes have a smaller capacitance. Such tubes can reach higher energy densities, but require higher voltages to reach these energy densities. The gravimetric capacitance $$c_g = \frac{2u_g}{\Delta V^2}.$$

For example, a tube with flat electrodes and a gap size d=40 nm has a capacitance of $c_g$=2083 F/kg.

The charging-discharging rate of nano vacuum tubes is limited by their inductance, $$f \approx \sqrt{\frac{c_0^2}{d}} = \frac{c_o}{d},$$

where $c_0$ is the speed of light, and $A_c = d^2$ is the cathode area. Leak currents limit the charging-discharging rates too. The smallest discharging/charging rate is $$f = \frac{1}{RC},$$

where the resistance $$R = \frac{A_c}{\sigma_w d}$$

and the capacity $C = cA_c d$. Therefore, the charging/discharging rates of nano vacuum tubes are in the range $$\frac{\epsilon_0 A_c}{\sigma_w A_w}, \frac{e_t}{e_U} < f < \frac{c_0}{d}.$$

For a cavity with flat electrodes, gap size d=40 nm and $SiO_2$ walls $$\left(\sigma = 10^{-11} \frac{1}{\Omega m}\right)$$

the charge-discharge rate is in the range $10^{-22}$ Hz<f<7.5 THz. The lower limit is very small. This means that the tube holds the charge for many years and thus can be discharged very slowly without any losses. The upper limit is very large (See FIGS. 1A and 1B). This means that the vacuum nano tube can be discharged very quickly and has a high power density. The maximum power density in a 40 nm tube is $2.8 \times 10^{22}$ W/m³ ($1.1 \times 10^{19}$ W/kg).

As has been discussed above, vacuum breakdown triggered by field emission limits the energy density in vacuum tubes. However smaller tubes have a smaller field enhancement factor $\beta$. Therefore, the energy density in smaller tubes is larger. The energy density can be further enhanced by using a nano-tip anode. The tip enhancement factor for the energy density is $e_t = (S+2)/4$, however the voltage difference is enhanced too, by a factor $$e_U = \frac{(1+S)^2}{1+2S}.$$

Since nano vacuum tubes are empty, their average density is less than the density of the materials that constitute them. This sets a lower limit for the gravimetric energy density $u_{g.min} e_t P_w/P_w$, where $P_w$ is the compressive strength of the wall material. Nano vacuum tubes with an energy density u of more than 1 GJ/m³ have to be thick-walled. $u_{g.min}$ and the enhancement factors combine to make nano vacuum tubes the devices with the highest gravimetric energy density (See FIG. 1B). $u_{g.min}$ and the enhancement factors are due to the geometry of the device, and largely independent of the material properties, except for Eq. 1, the electric field $E_b$ at breakdown, and the compressive strength of the wall material. However Eq. 1 appears to hold for a large range of electrode materials and the breakdown field is pretty similar for many metals. Therefore the device should have a very similar energy storage capacity for a large range of electrode materials. For that reason, inexpensive, environmentally friendly materials can be used to fabricate it, including glass ($SiO_2$) as a wall material. The charging-discharging rates of nano tubes exceed those of all other known devices (See FIGS. 1A and 1B). Vacuum nano tubes can hold electric energy without any losses for many years, and can be charged and discharged rapidly. The largest charging-discharging rate for vacuum nano tubes is proportional to the ratio between the gap size and the speed of light, whereas the charging-discharging rate of batteries and electro-chemical capacitors depends on diffusion rates and chemical reaction rates. Conventional capacitors have a large inductance, leading to a charging-discharging rate that is comparatively small. The gravimetric power density of nano vacuum tubes could even exceed that of nuclear chain reactions because the gravimetric power density of nuclear chain reactions depends on the speed of neutrons which is much less than the speed of light. Since nano vacuum tubes use no faradic processes, their life time is much longer than electrolytic capacitors and batteries.

Nano vacuum tube arrays have great potential as power sources for electronic devices because they can be produced with standard lithographic processes and can be part of integrated circuits. Integrated circuits with an internal power source have small ohmic losses compared to circuits with an external energy supply and produce less heat.

In cases where each cavity is individually addressable, such as random access memory, the tubes can be charged and discharged in any arbitrary order. If a MOSFET is inserted in the wall of the vacuum tube, the state of the tube can be determined without charging or discharging it. In this case each nano vacuum tube has two gates, an energy gate and an information gate, similar to the floating gate and control gates in flash drives. Vacuum nano tubes with both gates can be used for information and energy storage. For example to store the number '22', the number is converted to binary notation, $22 = 10110_2$, and then the energy gates may be used to charge the first, third and fourth tubes, leaving the second and fifth tubes uncharged. When the energy gate holds a charge, it induces an electric field in the MOSFET that partially cancels the electric field from the electrodes of the information gate, which modifies the threshold voltage of the MOSFET. During read-out, a voltage slightly above the regular threshold voltages is applied to the information gate, and the MOSFET channel will become conducting or remain insulating, depending on the voltage threshold of the MOSFET, which depends on the charge on the energy gate. The current flow through the MOSFET channel is measured and provides a binary code, reproducing the stored data.

The embodiments of the invention described herein are intended to be merely exemplary; variations and modifications will be apparent to those skilled in the art. All such variations and modifications are intended to be within the scope of the present invention as defined in any appended claims.

I claim:

1. A method for storing energy, the method comprising:
   a. providing an array of vacuum tubes having walls, each vacuum tube including
      (1) an anodic electrode; and
      (2) a cathodic electrode spaced apart from the anodic electrode; and
      (3) a region intervening between the anodic electrode and the cathodic electrode of each vacuum tube evacuated to a pressure below $10^{-6}$ Torr; and
   b. storing an excess of electrons on the cathodic electrode.

2. A method in accordance with claim 1, wherein the array of vacuum tubes is characterized by a cross-sectional density of at least 100 vacuum tubes per square centimeter.

3. A method in accordance with claim 1, wherein each vacuum tube is a nano vacuum tube.

4. A method in accordance with claim 1, wherein the anodic electrode is pointed, curved, or flat.

5. A method in accordance with claim 1, wherein the anodic electrode is a nano-tip electrode.

6. A method in accordance with claim 5, wherein the nano-tip electrode is a Spindt tip.

7. A method in accordance with claim 5, further comprising reverse biasing each vacuum tube such that the cathodic electrode is at a negative electrical potential with respect to the nano-tip electrode.

8. A method in accordance with claim 5, wherein the nano-tip electrode is characterized by an apex radius comparable in size to a single atom.

9. A method in accordance with claim 5, wherein the nano-tip electrode includes a Mueller emitter.

10. A method in accordance with claim 5, wherein the nano-tip electrode includes a free-standing nano wire.

11. A method in accordance with claim 1, wherein the walls of the vacuum tubes are silica.

12. A method for configuring a device to deliver powers in excess of $10^{10}$ W/kg, the method comprising:
   a. providing the device, comprising an array of nano vacuum tubes having walls, each nano vacuum tube including
      (1) a nano tip anodic electrode; and
      (2) a flat electrode spaced apart from the nano tip anodic electrode; and
      (3) a region intervening between the nano tip anodic electrode and the flat electrode of each vacuum tube evacuated to a pressure below $10^{-6}$ Torr; and
   b. storing an excess of electrons on the cathodic electrode;
   c. coupling the nano tip electrodes and the flat electrodes to an external current path.

* * * * *